(12) United States Patent
Kosaki et al.

(10) Patent No.: US 8,802,984 B2
(45) Date of Patent: Aug. 12, 2014

(54) JUNCTION BLOCK, AND VEHICLE

(75) Inventors: Akihiro Kosaki, Aichi-ken (JP); Masaaki Iwabe, Toyota (JP); Kenji Iida, Nagoya (JP); Yoshinobu Furuya, Makinohara (JP); Yoshiaki Ichikawa, Makinohara (JP)

(73) Assignees: Toyota Jidosha Kabushiki Kaisha, Toyota-shi, Aichi-ken (JP); Yazaki Corporation, Tokyo (JP)

( * ) Notice: Subject to any disclaimer, the term of this patent is extended or adjusted under 35 U.S.C. 154(b) by 237 days.

(21) Appl. No.: 13/380,533

(22) PCT Filed: Jun. 29, 2010

(86) PCT No.: PCT/IB2010/001581
§ 371 (c)(1),
(2), (4) Date: Dec. 23, 2011

(87) PCT Pub. No.: WO2011/001252
PCT Pub. Date: Jan. 6, 2011

(65) Prior Publication Data
US 2012/0092846 A1 Apr. 19, 2012

(30) Foreign Application Priority Data
Jun. 30, 2009 (JP) ................................. 2009-155528

(51) Int. Cl.
*H02B 1/30* (2006.01)
*H02G 13/00* (2006.01)
*H01R 9/00* (2006.01)

(52) U.S. Cl.
USPC ............................................ 174/64; 361/823

(58) Field of Classification Search
None
See application file for complete search history.

(56) References Cited

U.S. PATENT DOCUMENTS 5,567,991 A * 10/1996 Schantz et al. ............... 307/10.1
5,643,693 A * 7/1997 Hill et al. ...................... 429/121

(Continued)

FOREIGN PATENT DOCUMENTS

DE 10 2004 043 138 A1 3/2006
EP 1 332 924 A1 8/2003

(Continued)

OTHER PUBLICATIONS

International Search Report in International Application No. PCT/IB2010/001581; Mailing Date: Nov. 5, 2010.

(Continued)

*Primary Examiner* — Hoa C Nguyen
*Assistant Examiner* — Xanthia C Cunningham
(74) *Attorney, Agent, or Firm* — Finnegan, Henderson, Farabow, Garrett & Dunner, LLP

(57) ABSTRACT

A junction block (40) includes a generally rectangular flat plate portion (42) attached to a side surface of an assembled battery. A control device (50) is disposed over a portion of the flat plate portion (42) which includes a middle of the flat plate portion (42) and which is positionally biased toward a lower side end of the flat plate portion (42). A connector-connecting portion (47) is provided in one of the four corners of the flat plate portion (42) that is a rear end corner of an upper side end opposite the lower side end of the flat plate portion (42). A rib (48) and a connector-connecting portion (49) are provided at a location on the flat plate portion (42) at which the rib (4) and the connector-connecting portion (49) clamp the electric power cable (28) that is connected to the connector-connecting portion (47) and that is laid along the upper side of the flat plate portion (42).

7 Claims, 4 Drawing Sheets

(56) References Cited

U.S. PATENT DOCUMENTS

| | | | |
|---|---|---|---|
| 5,645,448 A * | 7/1997 | Hill | 439/522 |
| 5,764,487 A * | 6/1998 | Natsume | 361/775 |
| 5,927,240 A * | 7/1999 | Maxon | 123/179.3 |
| 5,928,004 A * | 7/1999 | Sumida et al. | 439/76.2 |
| 6,010,341 A * | 1/2000 | Matsuoka | 439/76.2 |
| 6,027,360 A * | 2/2000 | Jenkins | 439/364 |
| 6,437,986 B1 * | 8/2002 | Koshiba | 361/752 |
| 6,642,633 B1 * | 11/2003 | Yang | 307/147 |
| 6,679,708 B1 * | 1/2004 | Depp et al. | 439/76.2 |
| 6,693,370 B2 * | 2/2004 | Yamane et al. | 307/10.1 |
| 7,072,188 B2 * | 7/2006 | Janisch | 361/826 |
| 7,233,474 B2 * | 6/2007 | Brown et al. | 361/104 |
| 7,303,405 B2 * | 12/2007 | Ikeda et al. | 439/76.2 |
| 7,341,480 B2 * | 3/2008 | Byrne | 439/532 |
| 7,442,052 B2 * | 10/2008 | Kinoshita et al. | 439/76.2 |
| 7,470,130 B2 * | 12/2008 | Kubota et al. | 439/76.1 |
| 7,471,002 B2 * | 12/2008 | Konishi | 290/31 |
| 2001/0023379 A1 * | 9/2001 | Tozuka et al. | 701/1 |
| 2002/0022387 A1 * | 2/2002 | Sumida | 439/76.2 |
| 2002/0180272 A1 | 12/2002 | Yuasa et al. | |
| 2003/0045137 A1 * | 3/2003 | Yamane et al. | 439/76.2 |
| 2003/0231482 A1 * | 12/2003 | Naimi et al. | 361/833 |
| 2004/0048142 A1 * | 3/2004 | Marusak et al. | 429/61 |
| 2004/0178798 A1 * | 9/2004 | Kikuchi et al. | 324/426 |
| 2004/0235355 A1 * | 11/2004 | Coniff | 439/638 |
| 2005/0153583 A1 * | 7/2005 | Kawamura et al. | 439/76.2 |
| 2006/0040526 A1 * | 2/2006 | Shirota | 439/76.2 |
| 2006/0096797 A1 * | 5/2006 | Tsuchiya | 180/68.5 |
| 2006/0128230 A1 * | 6/2006 | Korczynski et al. | 439/723 |
| 2006/0211300 A1 * | 9/2006 | Kubota et al. | 439/535 |
| 2006/0256543 A1 * | 11/2006 | Larson et al. | 361/826 |
| 2007/0254533 A1 * | 11/2007 | Kinoshita et al. | 439/709 |
| 2008/0146054 A1 * | 6/2008 | Byrne | 439/110 |
| 2008/0214033 A1 * | 9/2008 | Byrne | 439/215 |
| 2008/0231144 A1 * | 9/2008 | Grant et al. | 310/339 |

FOREIGN PATENT DOCUMENTS

| | | |
|---|---|---|
| EP | 1 369 305 A | 12/2003 |
| EP | 1 621 410 A | 2/2006 |
| JP | 2001-145212 | 5/2001 |
| JP | 2002-219949 | 8/2002 |
| JP | 2007-290616 | 11/2007 |
| JP | 2008-243729 | 10/2008 |

OTHER PUBLICATIONS

Written Opinion of the International Searching Authority in International Application No. PCT/IB2010/001581; Mailing Date: Nov. 5, 2010.

Applicant's Response to Written Opinion in International Application No. PCT/IB2010/001581 (Mar. 21, 2011).

Notification of Reason(s) for Refusal in Japanese Patent Application No. 2009-155528; Drafting Date: May 30, 2011.

* cited by examiner

JUNCTION BLOCK, AND VEHICLE

CROSS-REFERENCE TO RELATED APPLICATIONS

This application is a national phase application of International Application No. PCT/IB2010/001581, filed Jun. 29, 2010, and claims the priority of Japanese Application No. 2009-155528, filed Jun. 30, 2009, the contents of both of which are incorporated herein by reference.

BACKGROUND OF THE INVENTION

1. Field of the Invention

The invention relates to a junction block and to a vehicle.

2. Description of the Related Art

Japanese Patent Application Publication No. 2007-290616 (JP-A-2007-290616), for example, describes a junction block which has electronic component parts, such as relays and the like, for the purpose of connection between appliances disposed in an engine compartment, such as electric motors, inverters, etc., and a battery pack mounted at a rear side of the appliances, and to which high-voltage cables connected to the appliances are connected. A terminal block to which high-voltage cables are connected is attached to the junction block. The terminal block is provided at a front side of the battery pack, so that the high-voltage cables become shorter than those in a construction in which a terminal block is provided at a rear side of the battery pack. Besides, the terminal block is attached to one side of the junction block which faces in a vehicle width direction. The terminal block-side end portions of the high-voltage cables are connected to the terminal block so that the high-voltage cables extend in the vehicle width direction.

As for the junction block as described above, it is desirable to provide a construction such that the connection of the high-voltage cables will be more properly accomplished. Since the junction block has electronic component parts such as relays and the like, it is desirable that the electronic component parts be properly arranged with mutual association. It is desirable to cause the high-voltage cables to be more properly connected, for example, to allow the high-voltage cables to be connected without greatly affecting the arrangement of the electronic component parts.

SUMMARY OF THE INVENTION

The invention provides a junction block that allows more proper connection of electric power cables to the junction block.

A first aspect of the invention relates to a junction block that is attached to a side surface of an assembled battery mounted in a vehicle, the side surface extending in a longitudinal direction of the assembled battery, and that electrically connects the assembled battery and an appliance mounted in the vehicle. The junction block includes: a generally rectangular flat plate portion attached to the side surface of the assembled battery; a control device which has a relay that makes and breaks electrical connection between the assembled battery and the appliance, and which is disposed over a portion of the flat plate portion that includes a middle of the flat plate portion and that is positionally biased toward a first side of the flat plate portion; a cable-connecting portion which is electrically connected to an electrode of the assembled battery via the relay, and which is provided in one of four corner portions of the flat plate portion that is an end corner portion of a second side of the flat plate portion that is opposite the first side of the flat plate portion, and to which an electric power cable connected to the appliance is connected; and a cable-clamping portion that is provided at a location on the flat plate portion at which the cable-clamping portion clamps the electric power cable that is connected to the cable-connecting portion and that is laid along the second side.

In the foregoing junction block, the generally rectangular flat plate portion is attached to the side surface of the assembled battery, and the control device is disposed over a portion of the flat plate portion that includes a middle of the flat plate portion and that is positionally biased toward, that is, comparatively near to, the first side of the flat plate portion. The cable-connecting portion to which the electric power cable connected to the appliance is connected is provided in one of the four corner portions of the flat plate portion which is an end corner portion of the second side of the flat plate portion that is opposite the first side. Furthermore, the cable-clamping portion is provided at a location on the flat plate portion at which the cable-clamping portion is able to clamp the electric power cable that is connected to the cable-connecting portion and that is laid along the second side of the flat plate portion. That is, the electric power cable is connected to the cable-connecting portion, and is laid along the second side of the flat plate portion, and is clamped by the cable-clamping portion. Therefore, the electric power cable can be laid along the second side of the flat plate portion merely because the control device is disposed on the flat plate portion, at a position that is positionally biased toward, that is, comparatively near to, the first side of the flat plate portion, and because the cable-connecting portion is provided in one of the two end corner portions of the second, side of the flat plate portion. Hence, it is possible to lay out the electric power cable without greatly affecting the arrangement of various components of the control device, such as relays and the like, on the flat plate portion. That is, this construction is able to cause an electric power cable to be more properly connected to the junction block. In this case, if an electric power cable is connected to the cable-connecting portion, and is laid along the second side of the flat plate portion, and is clamped by the cable-clamping portion, and then is directed to extend substantially perpendicularly from the side surface of the assembled battery, it is possible to facilitate restraint of the stress that acts in the cable-connecting portion when force acts on the electric power cable outside the junction block, in comparison with a construction in which an electric power cable is connected to a cable-connecting portion, and is not laid along a flat plate portion but is immediately directed to extend substantially perpendicular to the side surface of an assembled battery.

In the foregoing construction, the cable-clamping portion may include a plate member that extends from a peripheral edge of the flat plate portion, and a connector member to which a signal cable for driving the relay is connected. This construction allows the electric power cable to be clamped by using component parts that are needed in order to construct the junction block, and makes it possible to reduce the number of component parts. In this case, the connector member may have such a shape as to restrict the electric power cable from moving substantially perpendicular to the side surface of the assembled battery. Furthermore, the plate member may be a member obtained by electrically insulating a bus bar that electrically connects the electrode of the assembled battery and the cable-connecting portion.

A second aspect of the invention relates to a vehicle. This vehicle includes a battery device obtained by attaching the foregoing junction block according to the foregoing first aspect to the assembled battery.

According to this construction, since the vehicle includes the battery device obtained by attaching the foregoing junction block of the first aspect to the assembled battery, the vehicle is able to achieve substantially the same effects as those achieved by the junction block of the invention, for example, the effect of being able to cause an electric power cable to be more properly connected to the junction block, and the like.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Embodiments of the invention will be described with reference to the drawings.

Figure 1:
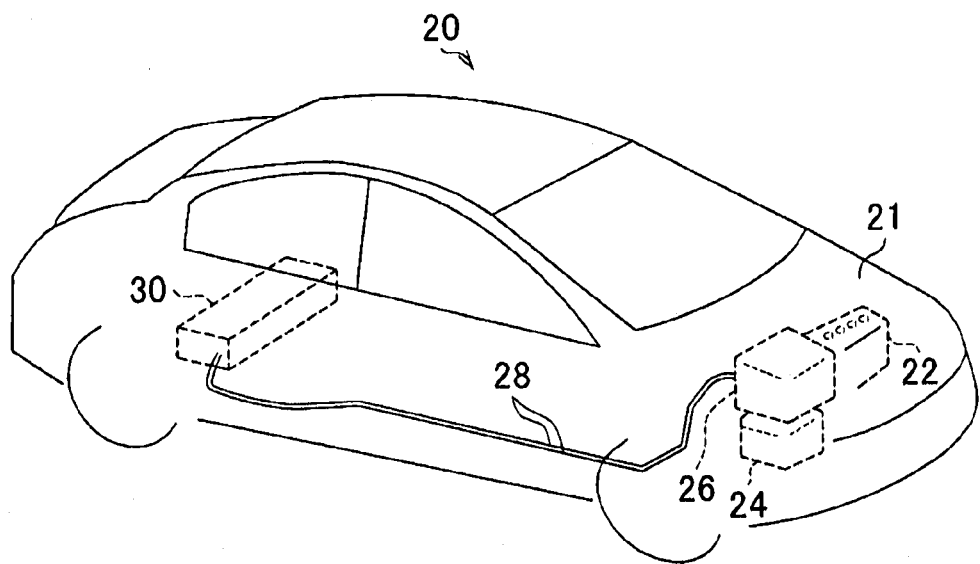
FIG. 1 is an illustrative diagram illustrating a state of a hybrid vehicle equipped with a battery device to which a junction block in accordance with an embodiment of the invention is attached, and with appliances needed for the traveling of the vehicle.

FIG. 1 is an illustrative diagram illustrating a state of a hybrid vehicle 20 equipped with a battery device 30 to which a junction block 40 in accordance with an embodiment of the invention is attached, and with appliances needed for the traveling of the vehicle. As shown in FIG. 1, appliances, such as an engine 22, an electric motor 24 that outputs motive power for the traveling of the vehicle, an inverter 26 that drives the electric motor 24, etc., are mounted in an engine compartment 21 that is provided in a front portion of the hybrid vehicle 20. The battery device 30 is mounted in a rear portion of the vehicle, and is connected to the inverter 26 via high-voltage electric power cables 28. The hybrid vehicle 20 of this embodiment is equipped with a hybrid-system electronic control unit (not shown), which is disposed in the engine compartment 21, includes a microprocessor that performs overall control of the vehicle. Through the driving control performed by the electronic control unit, the engine 22 is intermittently operated as needed, and the electric motor 24 is driven by the switching control of the inverter 26 so as to output motive power for the traveling of the vehicle by using electric power from the battery device 30, or so as to recover kinetic energy of the vehicle as electric power and store it into the battery device 30 through regenerative braking at the time of braking the vehicle. Incidentally, in this embodiment, the positional relations of appliances and component parts in their mounting, disposal, connection, etc. will be described with reference to the direction of the forward travelling of the vehicle.

Figure 2:
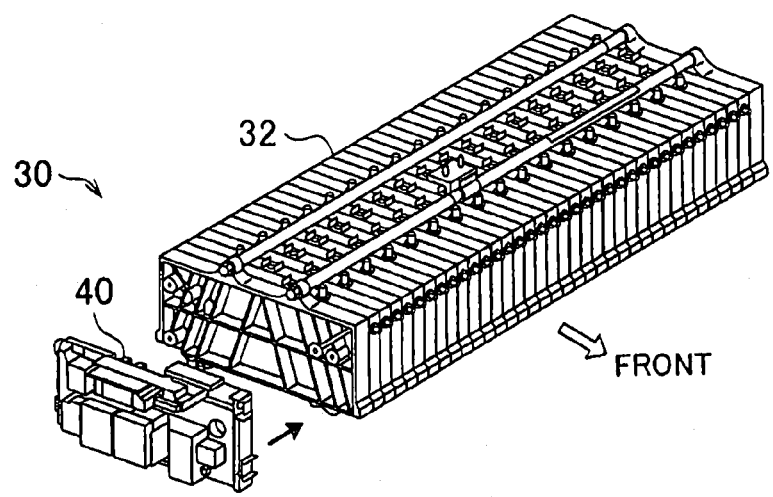
FIG. 2 is a construction diagram showing an example of a general construction of the battery device.
Figure 3:
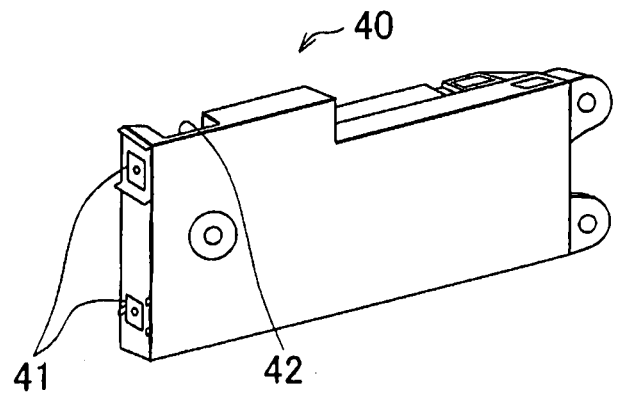
FIG. 3 is an illustrative diagram showing an example of an attaching surface of the junction block to an assembled battery.

FIG. 2 is a construction diagram showing an example of an overall construction of the battery device 30. FIG. 3 is an illustrative diagram illustrating an example of a state of an attaching surface of the junction block 40 to the assembled battery 32. As shown in FIG. 2, the battery device 30 has a generally rectangular parallelepiped-shape assembled battery 32 whose longitudinal axis lies in the vehicle width direction, and a junction block 40 for electrically connecting the assembled battery 32 and the inverter 26 and severing the electrical connection therebetween and also for managing the state of the assembled battery 32. The junction block 40 is attached to a right-hand side surface of the assembled battery 32 as shown by a thick-line arrow in FIG. 2. This joined unit is housed in a case (not shown). Besides, as shown in FIG. 3, the attaching surface of the junction block 40 to the assembled battery 32 is formed as a generally rectangular flat surface. A front end portion of the junction block 40 (a left-hand side end portion thereof in FIG. 3) is provided with terminals 41 to which a bus bar (not shown) connected to the electrodes of the assembled battery 32 is connected. Hereinafter, a generally rectangular surface of the junction block 40 opposite the attaching surface thereof to the assembled battery 32 is termed the flat plate portion 42, and component parts of the junction block 40 that are disposed on the flat plate portion 42 will be described.

Figure 4:
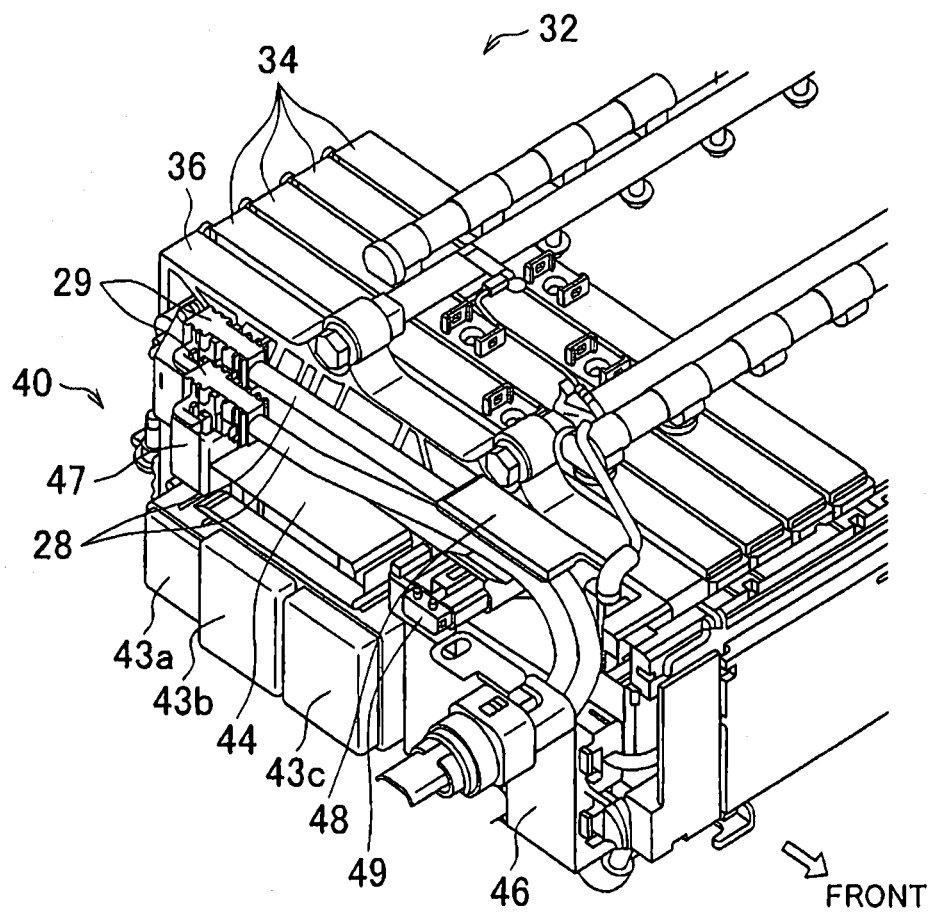
FIG. 4 is an illustrative diagram showing, as an example, component parts of the assembled battery and the junction block, and a state in which electric power cables are connected to the junction block.
Figure 5:
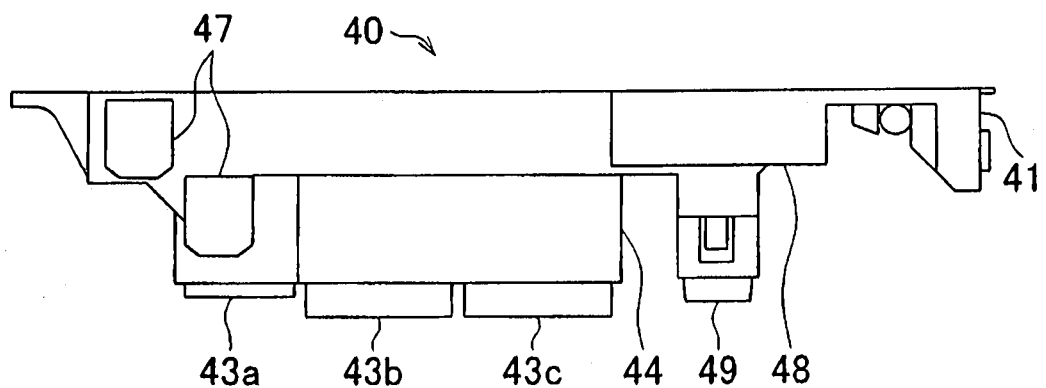
FIG. 5 is a top view of the junction block for schematically illustrating arrangement of component parts of the junction block.
Figure 6:
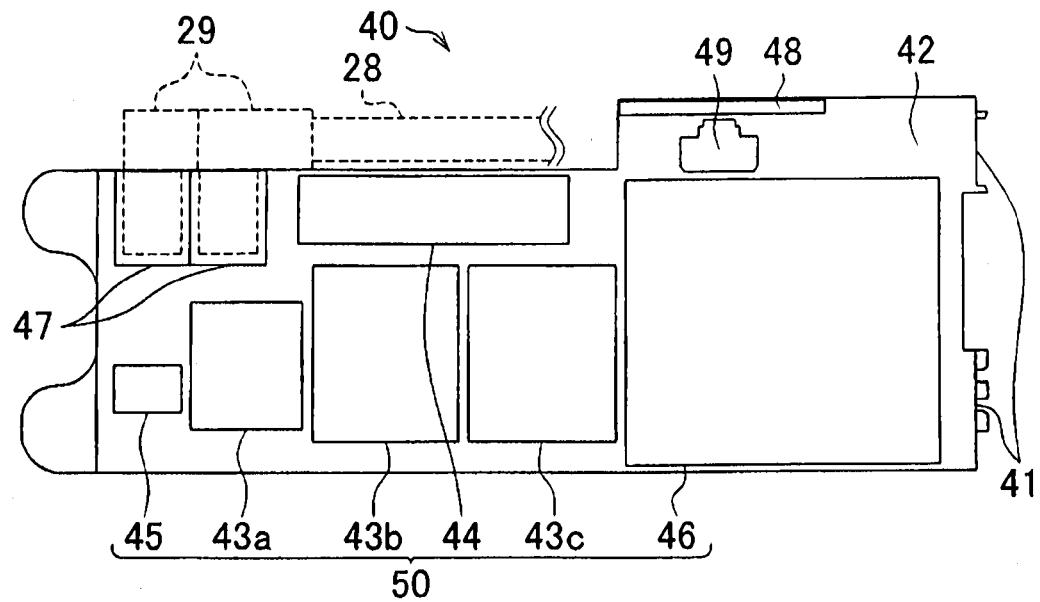
FIG. 6 is a right-hand side view of the junction block for schematically illustrating arrangement of component parts of the junction block.

FIG. 4 is an illustrative diagram showing, as an example, component parts of the assembled battery 32 and the junction block 40, and a state in which the electric power cables 28 are connected to the junction block 40. Besides, FIG. 5 is a top view of the junction block 40 for schematically illustrating the arrangement of the component parts of the junction block 40, and FIG. 6 is a right-hand side view of the junction block 40. As shown in FIG. 4, the assembled battery 32 has a plurality of battery modules 34 that are secondary batteries, and end plates 36. The assembled battery 32 is formed in a generally rectangular parallelepiped shape by stacking the battery modules 34 in the vehicle width direction so that the modules 34 are serially connected, and attaching the end plates 36 to two end surfaces of the stack of the battery modules 34 so as to constrain the stack as a whole. FIG. 4 shows only the right-hand end surface of the two end surfaces of the assembled battery 32. Besides, as shown in FIG. 4 to FIG. 6, the junction block 40 has: the foregoing terminals 41 that are electrically connected to the electrodes of the assembled battery 32; the foregoing generally rectangular flat plate portion 42; three relays 43a, 43b and 43c that make and break the electrical connection between the assembled battery 32 and the inverter 26; current restriction-purpose resistor 44 that is connected in series to the relay 43a; a current sensor 45 that detects the electric current that flows to the assembled battery 32; a battery electronic control unit 46 including a microprocessor that inputs the battery temperature from a temperature sensor (not shown) attached to the assembled battery 32, the charging/discharging current detected by the current sensor 45, etc., and that manages the state of the assembled battery 32; connector-connecting portions 47 to which the high-voltage electric power cables 28 connected to the inverter 26 are connected; a plate rib 48 provided as a portion of a member provided by electrically insulating a bus bar that electrically connects the terminals 41 and the connector-connecting portions 47 via the relays 43a, 43b and 43c, and the resistor 44; and a connector-connecting portion 49 to which a signal cable (not shown) for conducting signals that are output from the foregoing hybrid-system electronic control unit and that designate the on/off state of the relays 43a, 43b and 43c, and the like, is connected. As shown by dotted lines in FIG. 6, a protruded connector 29 is attached to a distal end of each electric power cable 28. By fitting the connectors 29 into the connector-connecting portions 47 from above, the electric power cables 28 are connected to the connector-connecting portions 47. Hereinafter, the relays 43a, 43b and 43c, the resistor 44, the current sensor 45 and the battery electronic control unit 46 are collectively termed the control device 50, and the arrangement of the component parts of the junction block 40 on the flat plate portion 42 will be described.

Figure 7:
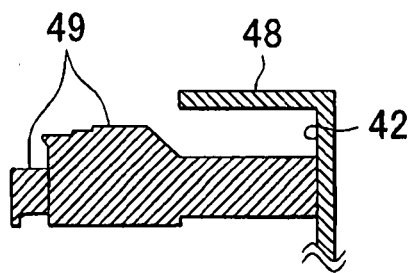
FIG. 7 is a cross-sectional view of a rib and a connector-connecting portion which is taken from the front and is for schematically illustrating the configuration of the connector-connecting portion.

As shown in FIG. 4 to FIG. 6, the control device 50 is disposed over a portion of the generally rectangular flat plate portion 42 which extends from its central portion to its lower side end. The connector-connecting portions 47 are provided in a corner portion of the flat plate portion 42 that is along the upper side end of the flat plate portion 42 and is adjacent to the rear end (the left-hand end in FIG. 4 to FIG. 6) thereof. Besides, the rib 48 is provided at a location that is slightly forward of a middle point between the rear end corner of the upper side end of the flat plate portion 42 and the front end corner of the upper side end thereof, and is formed as a member that extends from a peripheral edge of the flat plate portion 42. The connector-connecting portion 49 is provided on the flat plate portion 42 at a location that is below the rib 48 and has such a clearance from the rib 48 that the electric power cables 28 can be clamped between the connector-connecting portion 49 and the rib 48. Besides, the connector-connecting portion 49, as shown in a cross-sectional view in FIG. 7 which is taken from the front, has a predetermined configuration in which a portion of the connector-connecting portion 49 that faces the rib 48 has a thin plate shape, and the thickness of the connector-connecting portion 49 increases to an upper side with increases in the distance from the flat plate portion 42 (with increases in the distance from a side surface of the assembled battery 32 in a direction perpendicular to the side surface). With this configuration, the connector-connecting portion 49, working together with the rib 48, is able to clamp the electric power cables 28. Hence, after the connectors 29 attached to the distal ends of the electric power cables 28 are fitted into the connector-connecting portions 47, the electric power cables 28 are laid along the upper side end of the flat plate portion 42, and are clamped by the rib 48 and the connector-connecting portion 49 that are provided on the flat plate portion 42, at a predetermined location such that the electric power cables 28 can be appropriately clamped. Then, the electric power cables 28 are disposed so as to separate from the flat plate portion 42 at the front end corner of the upper side end of the flat plate portion 42 (so as to change their direction from the direction along the side surface of the assembled battery 32 into a direction perpendicular to the side surface thereof). Thus, in the junction block 40 of this embodiment, the electric power cables 28 can easily be laid along the upper side end of the flat plate portion 42 merely because the control device 50 is disposed with a positional bias toward, that is, comparatively near to, the lower side end of the flat plate portion 42 and the connector-connecting portions 47 are provided in a rear end corner portion along the upper side end. Therefore, the electric power cables 28 can be laid out without greatly affecting the arrangement of the various component parts of the control device 50. Besides, the electric power cables 28, after being connected to the connector-connecting portion 47 and being laid along the side surface of the assembled battery 32, is laid so as to change their direction to extend perpendicularly from the side surface of assembled battery 32. Therefore, in comparison with a construction in which the electric power cables 28 are not laid along the side surface of the assembled battery 32, but are immediately directed to extend from the connector-connecting portions 47 in a direction perpendicular to the side surface of the assembled battery 32, and are connected to the junction block 40, the construction of this embodiment is able to facilitate restraint of the stress that acts in the connector-connecting portions 47 when force acts on the electric power cables 28 outside the junction block 40 due to vibration of the vehicle, a collision of the vehicle, etc. Furthermore, since the electric power cables 28 are clamped by the rib 48 and the connector-connecting portion 49, the embodiment reduces the need to provide the electric power cables 28 or the junction block 40 with a protective member (e.g., a corrugate tube or the like) for preventing damage or abrasion associated with movement or vibration of the electric power cables 28 on the junction block 40, in comparison with a construction in which the electric power cables 28 are simply laid along the side surface of the assembled battery 32, and are not clamped. Thus, this embodiment allows reduction of the number of component parts and reduction of the size of the junction block 40. Furthermore, since the connector-connecting portion 49 has a predetermined configuration in which a thin plate portion thereof gradually increases in thickness toward a distal end side of the connector-connecting portion 49, it is possible to restrict the movement of the electric power cables 28 in a direction away from the side surface of the assembled battery 32 if the electric power cables 28 move in that direction. Therefore, the electric power cables 28 can be more certainly clamped. Besides, since the electric power cables 28 are clamped by using the rib 48 provided as a plate member obtained by electrically insulating the bus bar that electrically connects the terminals 41 and the connector-connecting portions 47, and also using the connector-connecting portion 49 to which the signal cable that conducts signals that designate the on or off state of the relays 43a, 43b and 43c, and the like is connected, that is, since the electric power cables 28 are clamped by using members that are needed for the junction block 40 to function, this embodiment allows reduction of the number of component parts of the junction block 40, in comparison with a construction in which a component part, such as a clamp or the like, is provided only for clamping the electric power cables 28. Furthermore, since the junction block 40 is attached to the side surface of the assembled battery 32, the junction block 40 can be more certainly protected from a frontal collision or a rear collision of the vehicle.

According to the foregoing junction block 40 of this embodiment, the control device 50 is disposed over a portion of the generally rectangular flat plate portion 42 attached to the side surface of the assembled battery 32 which portion includes a middle portion of the flat plate portion 42 and is positionally biased toward, that is, comparatively near to, the lower side end of the flat plate portion 42, and the connector-connecting portions 47 to which the electric power cables 28 connected to the inverter 26 are connected are provided in a rear end corner portion of the flat plate portion 42 along the upper side end thereof, and the rib 48 and the connector-connecting portion 49 are provided at such a location on the flat plate portion 42 that the rib 48 and the connector-connecting portion 49 clamp the electric power cables 28 while the electric power cables 28 are connected to the connector-connecting portions 47, and are laid along the upper side end of the flat plate portion 42. Therefore, the electric power cables 28 can be laid out without greatly affecting the arrangement of the component parts of the control device 50 on the flat plate portion 42. That is, the electric power cables 28 will be more properly connected to the junction block 40.

In the battery device 30 to which the junction block 40 of this embodiment is applied, the junction block 40 is attached to the right side surface of the assembled battery 32. However, the junction block 40 may also be attached to the left side surface of the assembled battery 32.

Although in the junction block 40 of this embodiment, the control device 50 is disposed with a positional bias toward, that is, comparatively near to, the lower side end of the flat plate portion 42, the control device 50 may also be disposed with a positional bias toward a side end of the flat plate portion 42 other than the lower side, for example, toward the upper side end.

Although in the junction block 40 of the embodiment, the connector-connecting portions 47 to which the electric power cables 28 are connected are provided at the rear end side of the upper side end of the flat plate portion 42, the connector-connecting portions 47 may also be provided at the front end side of the upper side end of the flat plate portion 42.

In the junction block 40 of the embodiment, the rib 48 is a plate member that is obtained by electrically insulating the bus bar that electrically connects the terminals 41 and the connector-connecting portions 47, and that extends from the peripheral edge of the upper side of the flat plate portion 42. However, the rib 48 may also be a simple plate member instead of being a member obtained by electrically insulating the bus bar. Furthermore, the rib 48 may also be a plate member that is attached to the flat plate portion 42, at a location that is slightly below the peripheral edge of the upper side of the flat plate portion 42, and that extends perpendicular to the assembled battery 32.

Although in the junction block 40 of the embodiment, the rib 48 and the connector 49 clamp the electric power cables 28, the clamping of the electric power cables 28 may also be accomplished in other manners. For example, the rib 48 may be provided further rearward so that the rib 48 and the register 44 are used to clamp the electric power cables 28. Alternatively, the connector-connecting portion 49 may also be provided above the resistor 44, so that the connector-connecting portion 49 and the resistor 44 are used to clamp the electric power cables 28. Furthermore, the rib 48 and the connector-connecting portion 49 may be replaced by a dedicated component part that clamps the electric power cables 28, such as a clamp, or the like, at an intermediate location between the front end and the rear end of the upper side end of the flat plate portion 42.

Although the embodiment has been described on the assumption that the battery device 30 formed by attaching the junction block 40 to the assembled battery 32 is mounted in the hybrid vehicle 20, other constructions are also possible. For example, the battery device 30 may be mounted in an electric vehicle that does not have an engine but moves by using only power from an electric motor, or the battery device 30 may be mounted in a moving object other than the vehicle, such as a ship or boat, an aircraft, etc. Furthermore, the battery device 30 may also be incorporated into an immobile facility, such as a construction facility or the like.

The correspondence relations between major elements of the embodiment and major elements of the invention described in the summary of the invention will be described. In the embodiment, the flat plate portion 42 corresponds to a "flat plate portion" in the invention, and the control device 50 corresponds to a "control device" in the invention. Furthermore, the connector-connecting portions 47 correspond to a "cable-connecting portion", and the rib 48 and the connector-connecting portion 49 correspond to a "cable clam portion". Besides, the rib 48 also corresponds to a "plate member", and the connector-connecting portion 49 also corresponds to a "connector member".

It is to be noted herein that the "flat plate portion" is not limited to the flat plate portion 42, but may be anything as long as it is attached to a side surface of an assembled battery and has a generally rectangular shape. For example, the "flat plate portion" may also be a generally rectangular member that is attached to a left side surface of the assembled battery 32. The "control device" is not limited to the control device 50, but may be any device as long as the device has a relay that electrically connects an assembled battery and an appliance and severs the electrical connection therebetween, and is disposed over a portion of the flat plate portion which includes a middle of the flat plate portion and which is positionally biased toward, that is, comparatively near to, one of the side ends of the flat plate portion. For example, the control device may be a device that does not have a current sensor 45, a device that has only one relay, etc. The "cable-connecting portion" is not limited to the connector-connecting portions 47, but may be anything as long as it is electrically connected to an electrode of an assembled battery via a relay, and is provided as a portion to which an electric power cable connected to an appliance is connected, and is provided at one of the four corners of the flat plate portion which is an end of one side of the four sides of the flat plate portion that faces a certain one of the four sides thereof. For example, the cable-connecting portion, may be a combination of the connector-connecting portions 47 and the connectors 29, and the like. The "cable-clamping portion" may be anything as long as it is provided at a location on the flat plate portion at which the cable-clamping portion is able to clamp an electric power cable that is connected to the cable-connecting portion and that is laid along the foregoing one side of the flat plate portion. For example, the cable-clamping portion may also be a portion that employs a clamp, or the like. Besides, the "plate member" is not limited to the rib 48, but may be anything as long as it extends from a peripheral edge of the flat plate portion. The "connector member" is not limited to the connector-connecting portion 49, but may be anything as long as it is provided so that a signal cable for driving a relay is connected thereto.

While a mode for carrying out the invention has been described above with reference to the embodiment, the invention is not limited to the embodiment at all. On the contrary, it should be apparent that the invention can be carried out in various forms without departing from the gist of the invention.

The invention is applicable to industries that manufacture junction blocks or vehicle, etc.

The invention claimed is:

1. A junction block that is attached to a side surface of an assembled battery mounted in a vehicle, the side surface extending in a longitudinal direction of the vehicle, and that electrically connects the assembled battery and an appliance mounted in the vehicle, the junction block comprising:

a generally rectangular flat plate portion attached to the side surface of the assembled battery;

a control device which has a relay that makes and breaks electrical connection between the assembled battery and the appliance, and which is disposed over a portion of the flat plate portion that includes a middle of the flat plate portion and that is positionally biased toward a first side of the flat plate portion;

a cable-connecting portion which is electrically connected to an electrode of the assembled battery via the relay, and which is provided in one of four corner portions of the flat plate portion that is an end corner portion of a second side of the flat plate portion that is opposite the first side of the flat plate portion, and to which an electric power cable connected to the appliance is connected; and a cable-clamping portion that is provided at a location on the flat plate portion at which the cable-clamping portion clamps the electric power cable that is connected to the cable-connecting portion and that is laid along the second side from said one end corner portion to another end corner portion of the second side.

2. The junction block according to claim 1, wherein the cable-clamping portion includes a plate member that extends from a peripheral edge of the flat plate portion, and a connector member configured to receive a signal cable for driving the relay.

3. The junction block according to claim 2, wherein the connector member has such a shape as to restrict the electric power cable from moving substantially perpendicular to the side surface of the assembled battery.

4. The junction block according to claim 2, wherein the plate member is a member obtained by electrically insulating a bus bar that electrically connects the electrode of the assembled battery and the cable-connecting portion.

5. A vehicle comprising a battery device obtained by attaching the junction block according to claim 1 to the assembled battery.

6. The junction block according to claim 2, wherein the plate member extends from the second side in the peripheral edge of the flat plate portion.

7. The junction block according to claim 6, wherein the plate member extends along the second side in the peripheral edge of the flat plate portion.

* * * * *